United States Patent [19]

Gittings

[11] Patent Number: 5,054,004

[45] Date of Patent: Oct. 1, 1991

[54] METHOD OF ACTIVE SONAR DETECTION OF A STATIONARY TARGET

[75] Inventor: Dan Gittings, Moorestown, N.J.

[73] Assignee: The United States of America as represented by the Secretary of the Navy, Washington, D.C.

[21] Appl. No.: 590,272

[22] Filed: Sep. 28, 1990

[51] Int. Cl.$^5$ ............................................. G01S 15/00
[52] U.S. Cl. .................................................. 367/100
[58] Field of Search ................ 367/100, 104, 99, 120, 367/123, 124, 126

[56] References Cited

U.S. PATENT DOCUMENTS 3,928,839  12/1975  Warner et al. ...................... 367/101
4,634,947  1/1987  Magori ................................ 367/100

Primary Examiner—Daniel T. Pihulic
Attorney, Agent, or Firm—Michael J. McGowan; Prithvi C. Lall; Michael F. Oglo

[57] ABSTRACT

A method of active sonar detection of a stationary target in the water from aboard a moving vessel. A moving vessel having an active sonar system transmits a series of sonic pings out into the water. The transmitted series generates a corresponding series of reflections. Each of the reflections contains 1) acoustic reverberation and noise, 2) reflections from moving objects and 3) reflections from a stationary target. Each of the reflections in the series is digitized and stored in a matrix memory. The reflections are shifted in the matrix memory based upon how fast the vessel is travelling between successive pings. Each of the columns in the matrix memory are then summed such that the summation attenuates the acoustic reverberation and noise as well as the reflection from any moving objects and generates an indication of the stationary target.

2 Claims, 3 Drawing Sheets

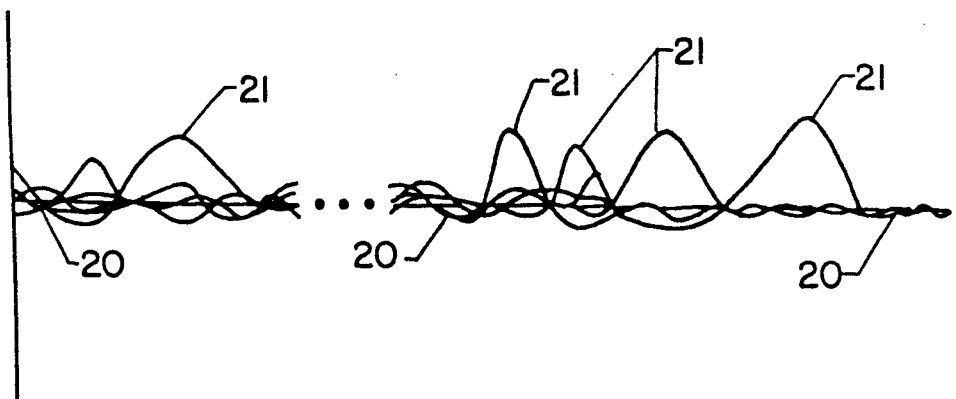

| $(R_1)_{r-1}$ | $(R_1)_r$ |
|---|---|
| $(R_2)_{r-2}$ | $(R_2)_{r-1}$ |
| $(R_3)_{r-3}$ | $(R_3)_{r-2}$ |

⋮

| $(R_N)_1$ | $(R_N)_2$ |
|---|---|

· · ·

|  |  |  |
|---|---|---|
| $(R_2)_r$ |  |  |
| $(R_3)_{r-1}$ | $(R_3)_r$ |  |

⋮

| $(R_N)_{r-2}$ | $(R_N)_{r-1}$ | $(R_N)_r$ |
|---|---|---|

FIG. 4

METHOD OF ACTIVE SONAR DETECTION OF A STATIONARY TARGET

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

This invention relates generally to active sonar detection and more particularly to a method of active sonar detection of a stationary target from aboard a moving vessel.

(2) Description of the Prior Art

The science of sonar detection of targets in water is unpredictable. Even current state-of-the-art, Doppler processing, active sonar detection systems, used to locate moving targets in water can yield false data when it comes to detecting stationary targets. Accordingly, it is necessary to be specific in the design of systems depending on the type of target that is being detected.

SUMMARY OF THE INVENTION

It is therefore an object of the present invention to provide a method of active sonar detection of a stationary target in any medium.

It is a further object of the present invention to provide a method of active sonar detection of a stationary target in water.

It is yet another object of the present invention to provide a method of active sonar detection of a stationary target capable of running in a high-speed digital processing environment.

Other objects and advantages of the present invention will become more obvious hereinafter in the specification and drawings.

In accordance with the method of the present invention, an active sonar system aboard a moving vessel transmits a series of sonic pings $P_n$, n=1, to N, through the water at successive time intervals. The sonic pings are reflected as a corresponding series $R_n$, n=1 to N back toward the vessel upon striking a stationary target. Each reflection series $R_n$ also contains reflections from moving objects as well as reverberation and noise. Each reflection series $R_n$ is sampled, digitized, and stored in a matrix memory of a computer. The matrix memory has N rows and r columns where r is the sampling rate per reflection $R_n$. Each previously sampled reflection $R_{n-1}$ is then shifted within the matrix memory with respect to the current sampled reflection $R_n$ by a delay based upon the speed at which the vessel is moving during the time between successive pings $P_{n-1}$ and $P_n$. After the last reflection series $R_N$ is stored in the matrix memory, each of the r columns of the matrix memory are summed from one to N whereby the reflections due to the moving objects as well as the reverberation noise tend to cancel each other out. However, the reflections due to the stationary target will be aligned in one of the r columns so that the summation of that column will attain a threshold value thereby indicating the presence of the stationary target.

BRIEF DESCRIPTION OF THE DRAWINGS

FIG. 2 is a graph of the acoustic reflection series $R_n$ with respect to time;

FIG. 3 is an N by r matrix memory used for storing a digitized series of reflections; and FIG. 4 is the N by r matrix after the digitized series of reflections has been shifted.

DESCRIPTION OF THE PREFERRED EMBODIMENT

Figure 1:
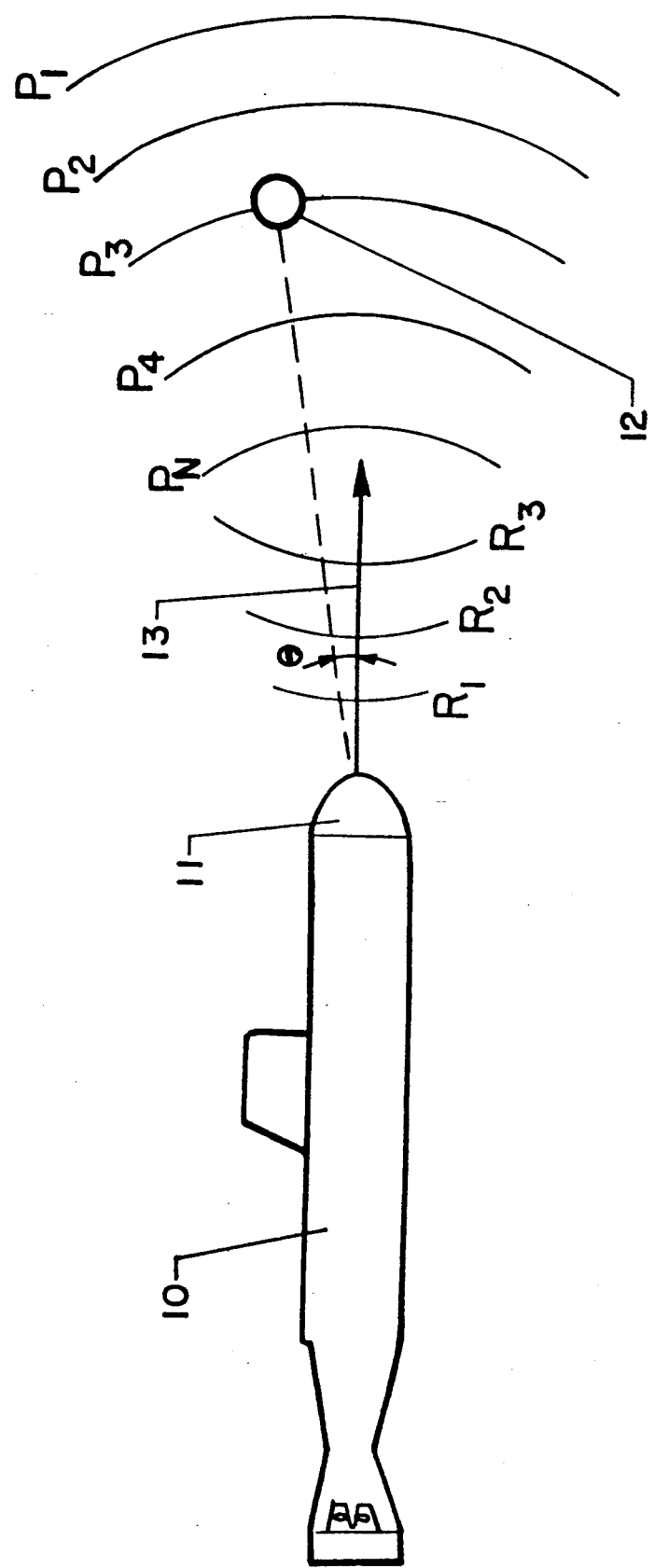
FIG. 1 is a schematic representation of a vessel transmitting a series of sonic pings and receiving a corresponding series of reflections in an active sonar system utilizing the method of the present invention.

Referring now to the drawings, and in particular to the schematic representation in FIG. 1, a moving vessel 10 having an active sonar system 11 shown. Moving vessel 10 is traveling in a direction indicated by an arrow referenced by numeral 13. For purposes of description, the vessel 10 is residing in a water environment. However, the method of the present invention applies equally as well to any medium that can transmit sound waves. The active sonar system 11, capable of sending and receiving acoustic information, sends out a series of sonic pings $P_n$, n=1 to N, into the water. Each sonic ping $P_n$ is an acoustic pulse that propagates out into the water as shown. The duration of each ping, length of time between each ping and frequency of each ping may vary. As will be shown, none of these variables are design constraints in the method of the present invention.

Each transmitted ping will also generate a reflection. Accordingly, the transmitted series $P_n$ generates a corresponding reflection series $R_n$, n=1 to N. Each reflection contains acoustic information that is comprised of 1) acoustic reverberation and noise, 2) acoustic reflection from any moving targets (not shown) and 3) acoustic reflection from one or more stationary target(s) 12. The duration of each sonic ping $P_n$ is approximately equal to the duration of each reflection $R_n$.

FIG. 2 is a graph showing the amplitude of each reflection $R_n$ with respect to time, for the entire reflection series $R_n$, n=1 to N. For ease of description, it is assumed that each ping $P_n$ is of equal duration. Accordingly, each reflection $R_n$ will also be of equal duration.

Sonar system 11 continually detects reverberation and noise, as well as reflections from moving targets and stationary target 12. The method of the present invention attenuates the reverberation, noise and reflection from moving targets in order to give a clear indication of stationary target 12. As shown in FIG. 2, each reflection $R_n$, n=1 to N, is basically sinusoidal in nature. Reverberation and noise typically appear as the lower-in-amplitude and random-in-nature signals as indicated generally by numeral 20. The large amplitude portions 21 of each reflection indicate reflections from a target, either moving or stationary. Thus, it is necessary to distinguish between the two types of targets.

Since the moving target is changing its own position at the same time the vessel 10 is changing its position, a reflection from a moving target, while appearing as a larger amplitude signal will also tend to be random in nature. In contrast, a reflection from a stationary target 12 not only appears as a larger amplitude signal, but is also repetitive in nature based upon how much distance the vessel 10 has traveled during the time interval between successive pings $P_{n-1}$ and $P_n$. For example, if vessel 10 were moving towards stationary target 12, a larger amplitude portion 21 of each reflection $R_n$ would occur earlier in the reflection as n approached N. Conversely, if vessel 10 were moving away from stationary target 12, the larger amplitude portion 21 of each reflection $R_n$ would occur later in the reflection as n approached N.

In order to take advantage of these reflection characteristics in a high-speed processing environment, it is first necessary to digitize the analog reflection series $R_n$, n=1 to N, shown in FIG. 2. Typically, this is accomplished by passing each reflection $R_n$ through a conventional analog-to-digital (A/D) converter set for a particular sampling frequency f. The choice of f will set the sampling rate r for each reflection $R_n$. The sampling rate r must be large enough to capture large and small amplitude portions of each reflection but small enough to avoid long processing times. Each reflection is sampled r times over its duration. Nominally, for a sonic ping lasting for one millisecond, a sampling rate of r=5 will suffice.

The sampled and digitized reflections are then stored in an N-row by r-column matrix memory where N is equal to the number of sonic pings and r is equal to the sampling rate. The N by r matrix memory is shown in FIG. 3 for reflections $R_1$ and $R_2$. Each element $(R_n)_m$, n=1 to N and m=1 to r, in the matrix contains amplitude information at a discrete point in the reflection. Thus, each element in the matrix contains an amplitude substantially indicative of either 1) reverberation and noise, 2) reflection from a moving target, or 3) reflection from the stationary target 12.

Next, each previously received reflection $R_{n-1}$ is shifted or delayed in the matrix memory with respect to the current reflection $R_n$ based upon the distance the vessel 10 has moved during the corresponding pings $P_{n-1}$ and $P_n$. Each shift or delay between each previous reflection $R_{n-1}$ and each current reflection $R_n$ can be calculated according to the equation:

$$\left[ \frac{V}{3600 \times \frac{1}{f} \times \frac{V_s}{6000} \times \frac{1}{2\Delta T}} \right] \cos\theta$$

where
V is the speed of the vessel 10 in knots,
f is the sampling frequency of the A/D converter,
$V_s$ is the average speed of sound in water,
$\Delta T$ is the time interval between successive pings $P_{n-1}$ and $P_n$, and
$\theta$ is the angle formed between the vessel's travel direction 13 and the target 12.

Figure 4:
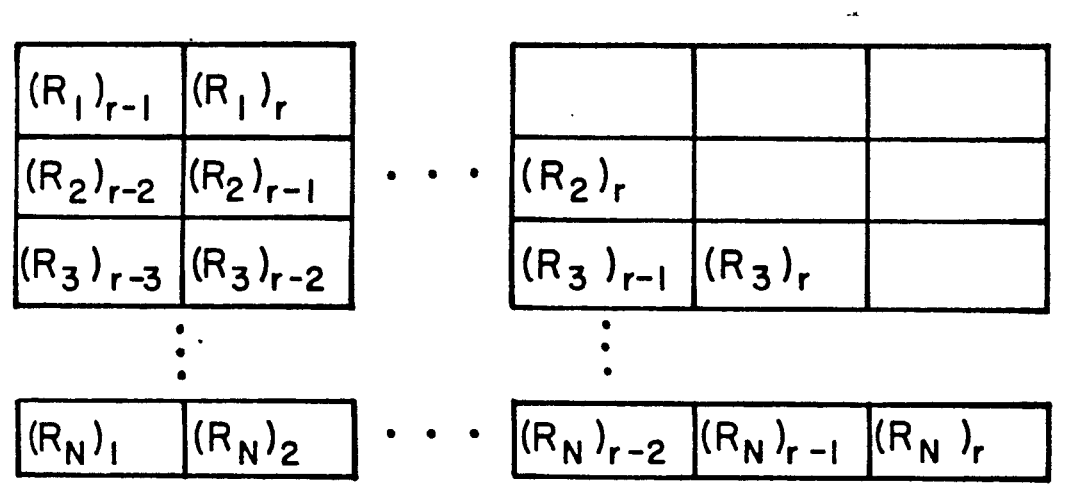

For ease of description each shift or delay, as shown in FIG. 4, is equivalent to the time between each sampling. However, each shift or delay could be greater than the time between samplings. For example, a delay between reflection $R_1$ and $R_2$ may be one element while the delay between the reflections $R_2$ and $R_3$ may be two elements. This will depend upon the speed V of the vessel 10.

Once the N by r matrix memory has been shifted or delayed for the entire reflection series, the individual elements within each column of the matrix are summed together. By shifting the elements of the matrix according to the distance the vessel has moved, those elements containing amplitude information from the stationary target 12 will be aligned in one of the matrix columns. The amplitude information from the stationary target 12 is then added together during the summation process and is indicative of a stationary target upon attaining a threshold value. The remaining columns will also be summed. However, these columns contain a combination of reverberation, noise and reflections from moving targets. The aforementioned random nature of these signals tend to cancel each other out during summation such that the threshold level attained by the stationary target matrix column is never achieved. Thus, the reverberation, noise and reflection from moving objects are attenuated by the method of the present invention.

The advantages of the present invention are numerous. The method specifically addresses the problem of stationary target detection with an active sonar detection system. The method achieves acoustic detection of a stationary target while attenuating acoustic information from moving targets as well as reverberation and noise. The method is easily adapted to run in a high-speed processing environment since it uses a matrix memory and simple calculations. Thus, it will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. In an active sonar system for detecting the presence of a stationary target located in a medium, said system residing aboard a moving vessel having means for transmitting successively a plurality of sonic pings through the medium, means for receiving a plurality reflections of said sonic pings to form a series, means for converting said plurality of received reflection pings of said plurality of sonic pings from said target to a digitized form at a preselected frequency using a plurality of analog-to-digital converters, means for shifting each of said plurality of digitized reflections by a delay corresponding to a distance that said vessel moves during each of said plurality of successive transmission time intervals, means for storing and summing said plurality of said digitized reflections in a computer, a method of active sonar detection comprising the steps of:

providing said computer for storing and processing said plurality of reflections;

transmitting said plurality of sonic pings through said medium being successively transmitted at time intervals to form said series;

receiving said plurality of reflections each member thereof related to a corresponding member of said plurality of transmitting sonic pings;

storing each of said plurality of reflection in said computer;

digitizing each of said plurality of reflections using said plurality of analog-to-digital converters at the preselected frequency;

shifting each of said plurality of reflections by a delay corresponding to a distance moved by said vessel wherein said delay is given by an equation $$\left[ \frac{V}{3600 \times \frac{1}{f} \times \frac{V_s}{6000} \times \frac{1}{2\Delta T}} \right] \cos\theta$$

where
V is the vessel speed in knots,
f is the sampling frequency of said A/D converter,
$V_s$ is the average speed of sound in the medium, $\Delta T$ is said transmission time interval between successive sonic pings, $\theta$ is an angle formed between a travel direction of the moving vessel and said target; and repetitively calculating in said computer for each of said transmitted series a sum of said shifted and digitized reflections wherein said sum indicates detection of said target when said sum attains a threshold value.

2. A method according to claim 1 which further includes the step of:

transmitting a series of sonic pings $P_n$, n=1 to N, through the medium, said sonic pings $P_n$ being successively transmitted at time intervals to form said series;

receiving a reflection $R_n$, n=1 to N for each of said sonic pings $P_n$, each of said received reflection $R_n$, being successively received at time intervals, each of said received reflections $R_n$, comprising a combination of (a) reflection due to said stationary target, (b) reflection due to any moving objects, and (c) reverberation and noise within the medium;

digitizing said plurality of received reflections;

sampling each of said received reflections $R_n$, at a sampling rate r per received time interval to generate a sampled reflection series comprising elements $(R_n)_m$, m=1 to r;

storing each of said elements $(R_n)_m$ in a matrix memory, said matrix memory having N rows and r columns, each of said sampled reflection series occupying one of said N rows;

shifting, in said matrix memory, each previously sampled reflection series elements $(R_{(n-1)})_m$, m=1 to r, with respect to a current sampled reflection series $(R_n)_m$ by a delay based upon a speed at which said vessel is moving during the time between successive pings $P_{n-1}$ and $P_n$; and summing each of said r columns wherein the reflection due to any moving objects and the reverberation and noise within the medium will tend to be canceled out and the reflection due to the stationary target is indicative of said target when a sum of one of said r columns attains a threshold level.

* * * * *